United States Patent [19]

Dobberpuhl

[11] 4,224,996
[45] Sep. 30, 1980

[54] CONTROL MECHANISM FOR A WALK-BEHIND ROTARY TILLER

[75] Inventor: Dale R. Dobberpuhl, Horicon, Wis.

[73] Assignee: Deere & Company, Moline, Ill.

[21] Appl. No.: 967,501

[22] Filed: Dec. 7, 1978

[51] Int. Cl.² .................... A01B 33/02; A01B 33/08
[52] U.S. Cl. ................................. 172/42; 180/19 H; 180/272; 474/133
[58] Field of Search ............... 172/42, 43, 125; 74/551.6, 242.1 R, 242.1 A, 551.1, 242.1 TA; 180/19 R, 19 H, 272

[56] References Cited

U.S. PATENT DOCUMENTS

| Re. 14,254 | 1/1917 | White | 74/543 |
|---|---|---|---|
| 3,921,373 | 11/1975 | Rubin | 172/42 |
| 3,941,006 | 3/1976 | Brodesser | 74/242.1 R |
| 4,139,064 | 2/1979 | Dobberpuhl | 172/43 |

FOREIGN PATENT DOCUMENTS

| 84591 | 1/1965 | France | 172/125 |
|---|---|---|---|
| 714394 | 8/1954 | United Kingdom | 172/43 |

Primary Examiner—Richard C. Pinkham
Assistant Examiner—Carl Moy

[57] ABSTRACT

A "dead man" control mechanism for controlling the propel and tiller drive of a walk-behind rotary tiller includes a flexible control element which extends between and has opposite ends looped about respective Z-shaped crank portions of a control rod and of a belt drive idler pulley arm. When the control rod is operator-held in a drive-engage position, wherein a grip portion of the control rod is gripped together with a grip portion of a handle of the tiller, the control element is tensioned such as to hold an idler pulley, carried by the idler arm, in slack-removing engagement with a slack run of a belt trained about drive and driven pulleys. Upon the operator releasing the grip portion of the control rod, the latter gravitates to a drive-disengage position wherein the control element is slackened such as to permit the idler pulley to move to permit the slack run of the drive belt to slacken to the extent that torque is no longer transferred between the drive and driven pulleys.

5 Claims, 2 Drawing Figures

CONTROL MECHANISM FOR A WALK-BEHIND ROTARY TILLER

BACKGROUND OF THE INVENTION

The present invention relates to walk-behind rotary tillers and more particularly relates to controls for the propel and tiller tool drives therefor.

It is known to provide power-driven walk-behind implements such as mowers and tillers and the like with belt drives which include idler pulleys that are selectively controllable by means of a hand-operated control member to effect torque transmission and disengaged conditions in the drives.

The prior art controls suffer from one or more of the disadvantages of being too complicated and too difficult to adjust for wear compensation.

SUMMARY OF THE INVENTION

According to the present invention there is provided an improved control for a belt drive of a walk-behind rotary tiller.

An object of the invention is to provide a simple, reliable control for a belt drive.

Another object of the invention is to construct an idler arm and hand-operated control member for easy attachment to the opposite ends of a flexible element for transmitting motion from the control member to the idler arm.

A more specific object is to provide an idler arm and control member which are each formed of a bent rod having crank portions including back turned portions to which the flexible element is attached.

These and other objects will become apparent from a reading of the ensuing description together with the appended drawing.

DESCRIPTION OF THE PREFERRED EMBODIMENT

Figure 2:
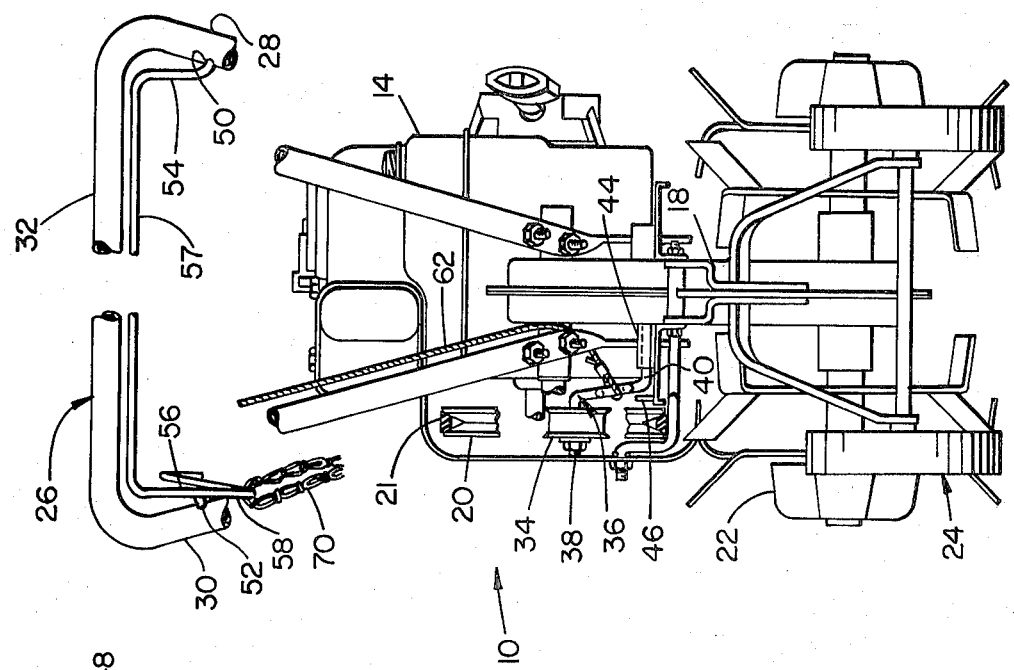
FIG. 2 is a rear elevational view of the rotary tiller shown in FIG. 1 but with parts being broken away for clarity.

Referring now to the drawing, therein is shown a rotary tiller 10 comprising a frame 12 made up of a pair of angle members. An engine 14 is mounted on the forward end of the frame 12 and has a transverse output shaft on which is mounted a drive pulley 16. Fixed between a rear portion of the angle members forming the frame 12 is a transmission case 18 having a driven pulley 20 rotatably supported in the upper end thereof in fore-and-aft alignment with the drive pulley 16. A drive belt 21 is disposed about the drive and driven pulleys for selectively transferring torque therebetween. Rotatably mounted in the lower end of the transmission case 18 is a drive axle of a rotary tilling tool 22 which is connected to be driven whenever the pulley 20 is driven. Fixed to the frame 12 behind the tool 22 and cooperating therewith to support the frame is a combined drag stake and support wheel assembly 24. The tiller 10 is guided by means of a handle 26 having right and left legs 28 and 30, respectively, having forward ends secured to the frame 12 and having rearward ends joined by a transverse grip portion 32.

Figure 1:
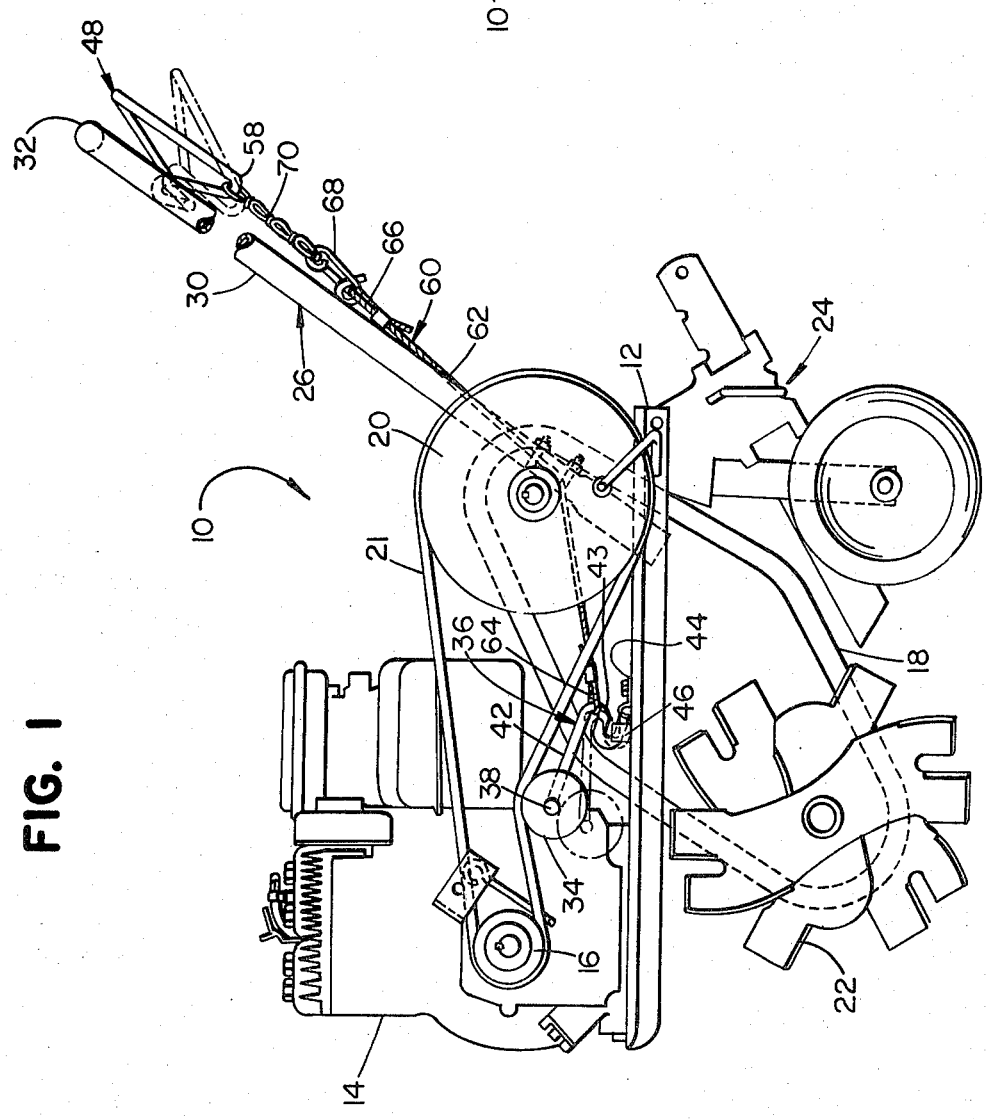
FIG. 1 is a left side elevational view of a rotary tiller embodying the present invention.

A control mechanism is provided for controlling power transmission between the drive and driven pulleys 16 and 20, respectively. Specifically, the control mechanism includes an idler pulley 34 engaged with a lower slack run of the belt 21 and mounted on the frame 12 for vertical swinging movement between drive-engage and drive-disengage positions, as respectively shown in solid and broken lines in FIG. 1. The pulley 34 is mounted on the frame 12 by means of an idler arm 36 in the form of a rod having first and second, parallel transverse ends 38 and 40, respectively, joined to each other by a crank portion 42 including a portion which is reversely bent such that the portion 42 is generally Z-shaped and, thus includes a rearwardly extending bend 43. The pulley 34 is rotatably mounted on the transverse end 38 of the idler arm and a bent strap 44 is bolted to the frame 12 and extends over the end 40 such as to cooperate with the frame to form a transverse receptacle in which the end 40 is received. A stop or projection 46 is fixed to the frame 12 and extends alongside the crank portion 42 such as to prevent the end 40 from being withdrawn from the receptacle.

A control rod 48 includes right and left, axially aligned out-turned ends respectively pivotally received in the handle legs 28 and 30 and joined to right and left crank portions 54 and 56 extending orthogonally thereto and joined by a transverse grip portion 57. The control rod 48 is thus vertically pivotally mounted on the handle beneath the grip portion 32 of the latter. The left crank portion 56 includes an intermediate, downwardly extending bend 58. Connected between the control rod 48 and the idler arm 36 is a flexible element 60 in the form of a wire cable 62 having eyelets 64 and 66 at its front and rear ends. The eyelet 64 is received on the back-turned portion of the idler arm crank portion 42 while a clip 68 is received on the eyelet 66 and connects selected links of a chain 70 such that the latter is fixedly looped about the bend 58 of the left crank 56 of the control rod 48.

Thus, it will be appreciated, that when the operator grasps the grip portion 57 of the control rod 48 together with the grip portion 32 of the handle 26 the flexible element 600 will hold the idler arm 36 in an elevated position wherein the pulley 34 acts to tension the bottom slack run of the belt 21 such as to effect torque transmission between the drive and driven pulleys 16 and 20. If the operator should then release his grip on the control rod portion 57, gravity will cause the grip portion 57 to rotate away from the position 32 of the handle and at the same time the flexible element 60 will be slackened enough to permit the idler arm 36 to drop away from the slack run of the belt 21 thus resulting in the belt slack increasing to the extent that torque is no longer transferred between the drive and driven pulleys. To keep the control rod grip portion 57 from becoming separated from the handle grip portion 32 a distance greater than that for an operator to reach after gripping the portion 32, the bend 58 is located below the left handle leg 30 such as to engage the latter to hold the control rod in its drive-disengage position.

I claim:

1. In a walk-behind powered implement including a frame, an engine mounted on the frame, a working tool mounted on the frame, a drive train connecting the engine to the tool and including a drive belt encircling drive and driven pulleys and engaged by an idler pulley pivotally mounted on the frame for movement between drive-effecting and drive-disengaging positions; a handle having a pair of transversely extending legs fixed to the frame at their forward ends and joined at their rearward ends by a transverse grip portion, the improvement of a control mechanism for the idler pulley, comprising; said idler pulley being pivotally supported on the frame by means of a first rod having parallel, spaced transversely extending first and second ends; said pulley being journaled on said first end and said second end being pivotally received in the frame; an intermediate generally Z-shaped crank portion joining said first and second ends; a drive control rod having first and second axially aligned transversely extending ends respectively received in the pair of legs of the handle adjacent the transverse grip portion of the latter; first and second crank portions respectively joined in orthogonally extending relationship to the last-mentioned first and second ends; the control rod having a transverse grip portion joining the first and second crank portions and swingable therewith about the first and second ends between a drive-disengage and engage position respectively wherein the grip portion of the rod is disposed away from and adjacent to the grip portion of the hand; one of said crank portions having a downwardly extending bend disposed beneath one of the pair of handle legs such as to engage the leg to support the control rod in its drive-disengage position, and a flexible element extending between and having its opposite ends connected to the Z-shaped crank portion of the first rod and the bend of the control rod.

2. In a walk-behind powered implement as defined in claim 1 wherein the flexible element includes a cable having an eyelet at one end received on the first rod.

3. In a walk-behind powered implement as defined in claim 1 wherein the second end of the first rod is pivotally secured to the frame by means of a strap bolted against a frame surface and bent to cooperate with the surface to define a receptacle in which the second end is received; and said frame including a projection extending alongside the Z-shaped crank portion such as to prevent the second end from shifting out of said receptacle.

4. In a walk-behind implement including a support structure supporting a power transmission including a drive belt extending around drive and driven pulleys and having a slack run, an idler pulley engaged with the slack run and being pivotally mounted on the support structure for movement between drive-engage and drive-disengage positions respectively wherein it tightens and permits the belt to go slack relative to the drive and driven pulleys, a control rod pivotally mounted on the support structure for movement between drive-engage and drive-disengage positions and connected to the idler pulley by a flexible element for causing the idler pulley to be moved to its positions corresponding to the control rod positions, an improved control rod and idler pulley support comprising; a first rod having opposite first and second parallel ends extending orthogonally relative to the slack run of the belt; said first end having the idler pulley rotatably mounted thereon and said second end being pivotally mounted on the support structure; a crank portion joining the first and second ends and including a rearwardly extending bend having one end of the flexible element connected thereto; said control rod having axially aligned opposite ends, extending parallel to the first and second ends of the first rod, and being pivotally received in the support structure; first and second crank portions respectively joined to the opposite ends in orthogonal projecting relationship thereto; said first crank portion including a downwardly extending bend having a second end of the flexible element connected thereto.

5. The walk-behind implement defined in claim 4 wherein said flexible element includes an eyelet at one end thereof received on the first rod.

* * * * *